(12) United States Patent
Sukegawa et al.

(10) Patent No.: US 6,776,142 B2
(45) Date of Patent: Aug. 17, 2004

(54) APPARATUS AND METHOD FOR SUPPLYING FUEL IN INTERNAL COMBUSTION ENGINE WITH VARIABLE VALVE LIFTER

(75) Inventors: Yoshihiro Sukegawa, Hitachi (JP); Toshiharu Nogi, Hitachinaka (JP); Takanobu Ichihara, Hitachinaka (JP); Hiroaki Saeki, Hitachinaka (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

(21) Appl. No.: 10/372,816

(22) Filed: Feb. 26, 2003

(65) Prior Publication Data

US 2004/0045533 A1 Mar. 11, 2004

(30) Foreign Application Priority Data

Sep. 6, 2002 (JP) ........................ 2002-261829

(51) Int. Cl.[7] .................. F02M 51/00; F02M 29/00
(52) U.S. Cl. .................. 123/478; 123/549; 123/590; 123/585
(58) Field of Search ................. 123/255, 437, 123/438, 478, 480, 491, 492, 493, 545, 546, 547, 549, 557, 590, 591, 585

(56) References Cited

U.S. PATENT DOCUMENTS

| | | | | |
|---|---|---|---|---|
| 3,661,125 A | * | 5/1972 | Stumpfig | 123/255 |
| 4,766,867 A | * | 8/1988 | Gantenbine | 123/438 |
| 5,685,276 A | * | 11/1997 | Tanaka et al. | 123/478 |
| 6,619,266 B2 | * | 9/2003 | Koseki | 123/478 |

FOREIGN PATENT DOCUMENTS

| | | | | |
|---|---|---|---|---|
| JP | 59 063406 A | * | 4/1984 | |
| JP | 08 200168 A | * | 8/1996 | |
| JP | 09-250422 | | 9/1997 | |
| JP | 10-169526 | | 6/1998 | |
| JP | 2002-097916 | | 4/2002 | |

* cited by examiner

Primary Examiner—Willis R. Wolfe
(74) Attorney, Agent, or Firm—Crowell & Moring LLP

(57) ABSTRACT

On supplying fuel in an internal combustion engine, a control signal for changing a degree of vaporization of the fuel passing the air intake valve in accordance with the opening degree of the air intake valve or a load of the internal combustion engine so that the fuel of liquid state is restrained from existing in the combustion chamber is generated, and subsequently a vaporizing speed of the supplied fuel is changed in accordance with the control signal to adjust the degree of vaporization of the fuel.

33 Claims, 13 Drawing Sheets

EXHAUST STROKE

INTAKE AIR STROKE

APPARATUS AND METHOD FOR SUPPLYING FUEL IN INTERNAL COMBUSTION ENGINE WITH VARIABLE VALVE LIFTER

BACKGROUND OF THE INVENTION

The present invention relates to an apparatus and method for supplying fuel in an internal combustion engine with a variable valve lifter, preferably usable in an automobile.

A prior art internal combustion engine as disclosed by JP-A-2002-97916 includes a variable valve lifter by which lifter a lifted distance and/or a lift timing of an air intake valve is adjusted in accordance with an operating condition of the engine so that a mileage under low-load operation and an output power under high-load operation are improved.

BRIEF SUMMARY OF THE INVENTION

An object of the present invention is to provide an apparatus and method for supplying fuel in an internal combustion engine with a variable valve lifter, by which apparatus and method unburned carbon hydride is restrained from being exhausted from the internal combustion engine.

An apparatus for supplying fuel in an internal combustion engine including a combustion chamber, an air intake valve for selectively allowing an air and the fuel through the air intake valve to flow into the combustion chamber, and a variable valve lifter for adjusting an opening degree of the air intake valve with respect to the combustion chamber at each of combustion cycles, according to the present invention, comprises a vaporizing speed adjuster for changing a vaporizing (vaporization or vaporized fuel increasing) speed of the supplied fuel in accordance with a control signal to adjust a degree of vaporization of the fuel passing the air intake valve, and a controller for generating the control signal for changing the degree of vaporization of the fuel in accordance with at least one of the opening degree of the air intake valve and a load to be borne by the internal combustion engine (that is, an output torque or power to be output by the internal combustion) engine to restrain the fuel of liquid state from existing in the combustion chamber.

Since the vaporizing (vaporization or vaporized fuel increasing) speed of the supplied fuel is changed to adjust the degree of vaporization (for example, mass flow rate % of the vaporized fuel with respect to the whole mass flow rate of the supplied fuel) of the fuel passing the air intake valve so that the fuel of liquid state is restrained from existing in the combustion chamber, unburned carbon hydride generated from the fuel of liquid state existing in the combustion chamber is restrained from being exhausted from the internal combustion engine without unnecessary energy consumption for vaporizing always the fuel and/or vaporizing the whole of the fuel.

A method for supplying fuel in an internal combustion engine including a combustion chamber, an air intake valve for selectively allowing an air and the fuel to flow through the air intake valve into the combustion chamber, and a variable valve lifter for adjusting an opening degree of the air intake valve with respect to the combustion chamber at each of combustion cycles, according to the present invention, comprises the steps of: generating a control signal for changing a degree of vaporization of the fuel passing the air intake valve in accordance with at least one of the opening degree of the air intake valve and a load (for example, an output torque or power) of the internal combustion engine to restrain the fuel of liquid state from existing in the combustion chamber, and changing a vaporizing (vaporization increasing) speed of the supplied fuel in accordance with the control signal to adjust the degree of vaporization of the fuel.

Since the vaporizing (vaporization or vaporized fuel increasing) speed of the supplied fuel is changed to adjust the degree of vaporization (for example, mass flow rate % of the vaporized fuel with respect to the whole mass flow rate of the supplied fuel) of the fuel passing the air intake valve so that the fuel of liquid state is restrained from existing in the combustion chamber, unburned carbon hydride generated from the fuel of liquid state existing in the combustion chamber is restrained from being exhausted from the internal combustion engine without unnecessary energy consumption for vaporizing always the fuel and/or vaporizing the whole of the fuel.

If the control signal is generated in such a manner that the vaporizing speed of the fuel is increased in accordance with (for example, in proportion to) decrease of the opening degree of the air intake valve and/or the load, the unnecessary energy consumption is effectively decreased. If the control signal is generated in such a manner that the vaporizing speed of the fuel obtainable when the opening degree of the air intake valve and/or the load is not more than a predetermined value is higher than the vaporizing speed of the fuel obtainable when the opening degree of the air intake valve and/or the load is more than the predetermined value, an adjustment of the vaporizing speed of the fuel is easily performed by only switching on and off the acceleration of the vaporization of the fuel.

The vaporizing speed adjuster may include a heater to heat the supplied fuel so that the vaporization of the fuel is accelerated by thermal energy to increase the degree of vaporization of the fuel. The vaporizing speed of the supplied fuel may be changeable in accordance with a variation of the heating thermal energy quantity. The vaporizing speed adjuster may include an air injector to inject an air into the fuel so that the vaporization of the fuel is accelerated by collision between the fuel and the injected air (for forming fuel fine mist to decrease diameter of the mist particles so that a ratio of surface area of particle to mass of particle is increased to accelerate the vaporization of the fuel) to increase the degree of vaporization of the fuel. The vaporizing speed of the supplied fuel may be changeable in accordance with a mass flow rate of the injected air.

The vaporizing speed adjuster may include a fuel injector to change a timing of fuel injection with respect to a pressure in the combustion chamber in accordance with the control signal, and the control signal is generated in such a manner that the pressure in the combustion chamber obtainable when the fuel is injected by the fuel injector lowers in accordance with a decrease of the opening degree of the air intake valve and/or the load so that the vaporization of the fuel is accelerated by a difference in pressure across (between upstream and downstream sides of) the air intake valve (increasing in accordance with decrease of the pressure in the combustion chamber) to increase the degree of vaporization of the fuel by stirring a mixture of the air and fuel with a high velocity of the mixture over the air intake valve and/or collision between the air and fuel for forming the fine particle fuel mist. If the fuel is injected with the pressure in the combustion chamber less than a predetermined degree and is prevented from being injected with the pressure in the combustion chamber not less than the predetermined degree, the stirring of the mixture of the air and fuel with the high velocity of the mixture over the air intake valve and/or collision between the air and fuel for forming the fine particle fuel mist is securely performed, by keeping the difference in pressure across the air intake valve more than a desirable degree. It is preferable for keeping the difference in pressure across the air intake valve more than the desirable degree that a pressure at an upstream side of the air intake valve in a fuel flow direction is higher than the pressure in the combustion chamber when the pressure in the combustion chamber is less than the predetermined degree. If the fuel is injected with the pressure in the combustion chamber less than the predetermined degree and is prevented from being injected with the pressure in the combustion chamber not less than the predetermined degree when the opening degree of the air intake valve and/or the load is not more than a predetermined value, the fuel may be injected with the pressure in the combustion chamber not less than the predetermined degree when the opening degree of the air intake valve and/or the load is more than the predetermined value, so that a large flow rate of the fuel at each combustion cycle can be supplied by a long time period (for example, including a part of an exhaust piston stroke time period) of the fuel injection to increase an output power of the engine when the opening degree of the air intake valve and/or the load is more than the predetermined value.

If the vaporizing speed adjuster includes the fuel injector to change a timing of fuel injection in accordance with the control signal, and when the opening degree of the air intake valve and/or the load is not more than a predetermined value, the fuel is injected during a flow of the air into the combustion chamber through the air intake valve and is prevented from being injected during a flow of an exhaust gas out of the combustion chamber, since the pressure in the combustion chamber during the flow of the air into the combustion chamber through the air intake valve, that is, the air intake piston stroke is lower than the pressure in the combustion chamber during the flow of the exhaust gas out of the combustion chamber through the air intake valve, that is, the exhaust piston stroke, the difference in pressure across the air intake valve (increasing in accordance with decrease of the pressure in the combustion chamber) is kept sufficiently large for increasing the degree of vaporization of the fuel by stirring the mixture of the air and fuel with the high velocity of the mixture over the air intake valve and/or collision between the air and fuel for forming the fine particle fuel mist.

The vaporizing speed adjuster may include a first fuel supply path capable of supplying a fuel of relatively high vaporization degree and a second fuel supply path capable of supplying a fuel of relatively low vaporization degree while the control signal is generated to change a ratio between a fuel flow rate through the first fuel supply path and a fuel flow rate through the second fuel supply path so that the vaporizing speed of the fuel is changed in accordance with the ratio.

The opening degree of the air intake valve may be a maximum opening degree of the air intake valve at each of the combustion cycles or a maximum distance of a movable valve body of the air intake valve at each of the combustion cycles from a shut-off position of the movable valve body thereof. It is preferable for restraining a film of the fuel from being formed on the air intake valve and the fuel of liquid state from being moved into the combustion chamber from the air intake valve that the vaporizing speed adjuster is arranged at an upstream side of the air intake valve in a fuel flow direction. The thermal energy of the heater may be obtained from at least one of electric power, a coolant of the combustion engine and an exhaust gas flowing out of the combustion chamber.

The opening degree of the air intake valve may be changed in accordance with a change of at least one of an output power and an output torque to be output by the engine, that is, a load to be borne by the combustion engine, for example, the greater the at least one of the output power and the output torque of the combustion engine to be output is, the greater the opening degree of the air intake valve is. When the opening degree of the air intake valve is changed in accordance with the change of the at least one of the output power and the output torque to be output by the engine, that is, the load to be borne by the combustion engine, the vaporizing (vaporization or vaporized fuel increasing) speed of the supplied fuel may be changed in accordance with the at least one of the output power and the output torque to be output by the engine, that is, the load to be borne by the combustion engine, instead of the opening degree of the air intake valve.

The vaporizing speed adjuster may include a vibrator to vibrate the fuel so that the vaporization of the fuel is accelerated by atomizing the fuel with vibrating the fuel to increase the degree of vaporization of the fuel by accelerating the vaporization of the supplied fuel.

According to the present invention, an apparatus for supplying fuel in an internal combustion engine including a combustion chamber, and an air intake valve for selectively allowing an air and the fuel through the air intake valve to flow into the combustion chamber, comprises a fuel supplier for supplying the fuel to an upstream side of the air intake valve, a vaporizing accelerator for at least one of vaporizing and atomizing in accordance with a control signal the fuel supplied by the fuel supplier, and a controller for generating the control signal for adjusting the at least one of vaporization and atomization of the fuel in accordance with a condition of the internal combustion engine. The condition of the internal combustion engine may be a load of the internal combustion engine or a maximum distance of a movable valve body of the air intake valve at each of the combustion cycles from a shut-off position of the movable valve body thereof while the maximum distance of the movable valve body is changeable in accordance with the load of the internal combustion engine. The fuel supplier may be a fuel injector. The vaporizing accelerator may include a heater, an atomizer or an air flow supplier for atomizing the fuel.

According to the present invention, a method for supplying fuel in an internal combustion engine including a combustion chamber, and an air intake valve for selectively allowing an air and the fuel to flow through the air intake valve into the combustion chamber, comprises the steps of: generating a control signal in such a manner that performance of at least one of vaporization and atomization of the fuel increases in accordance with a decrease in load of the internal combustion engine, and changing the performance of the at least one of vaporization and atomization of the fuel in accordance with the control signal. A maximum distance of a movable valve body of the air intake valve at each of the combustion cycles from a shut-off position of the movable valve body thereof may increase in accordance with an increase in load of the internal combustion engine.

Other objects, features and advantages of the invention will become apparent from the following description of the embodiments of the invention taken in conjunction with the accompanying drawings.

DETAILED DESCRIPTION OF THE INVENTION

Figure 1:
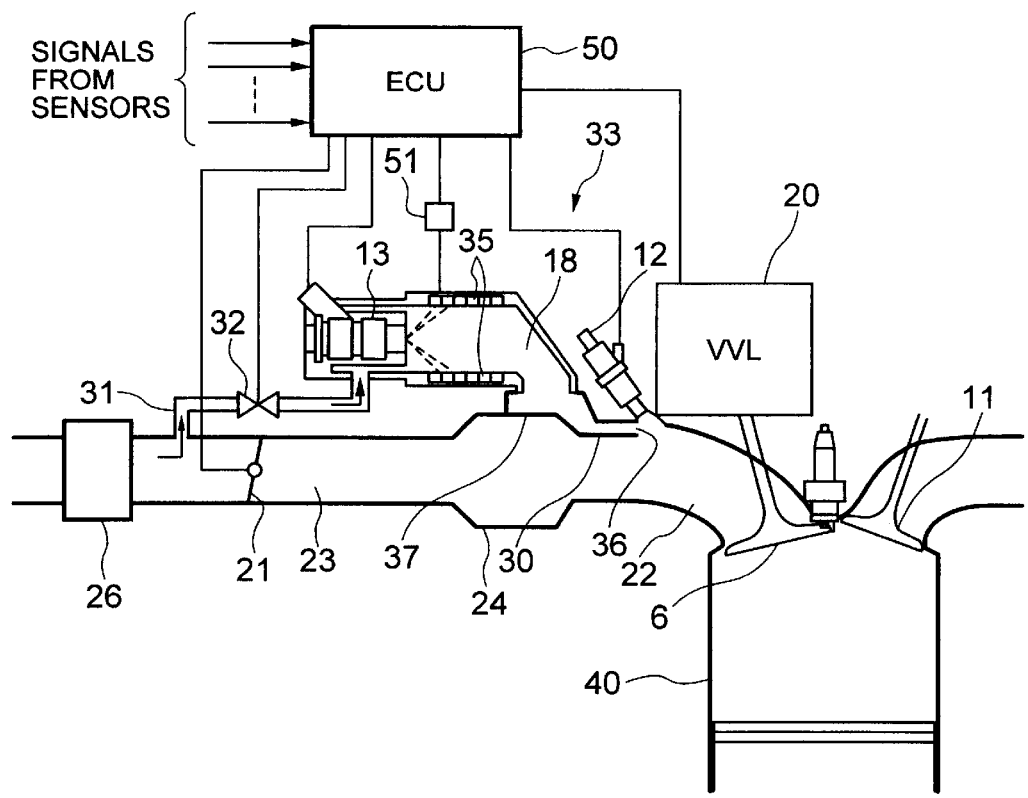
FIG. 1 is a schematic partially cross-sectional view showing a first embodiment fuel supply apparatus of the invention.
Figure 2:
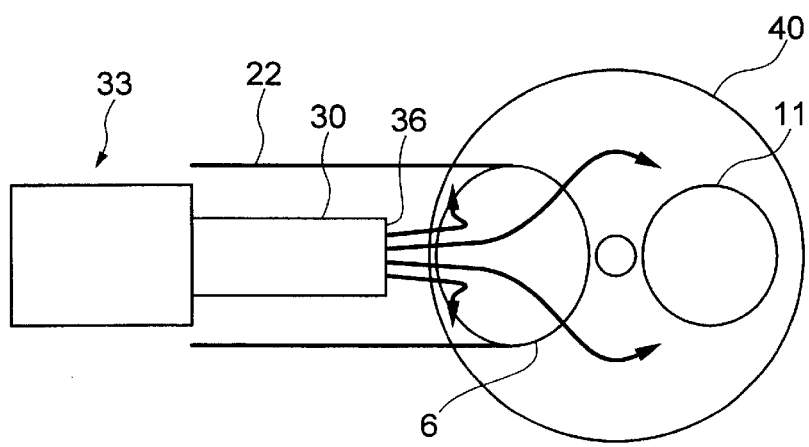
FIG. 2 is a schematic partially cross-sectional view showing the fuel supply apparatus of the invention as seen in a piston displacement direction.
Figure 3:
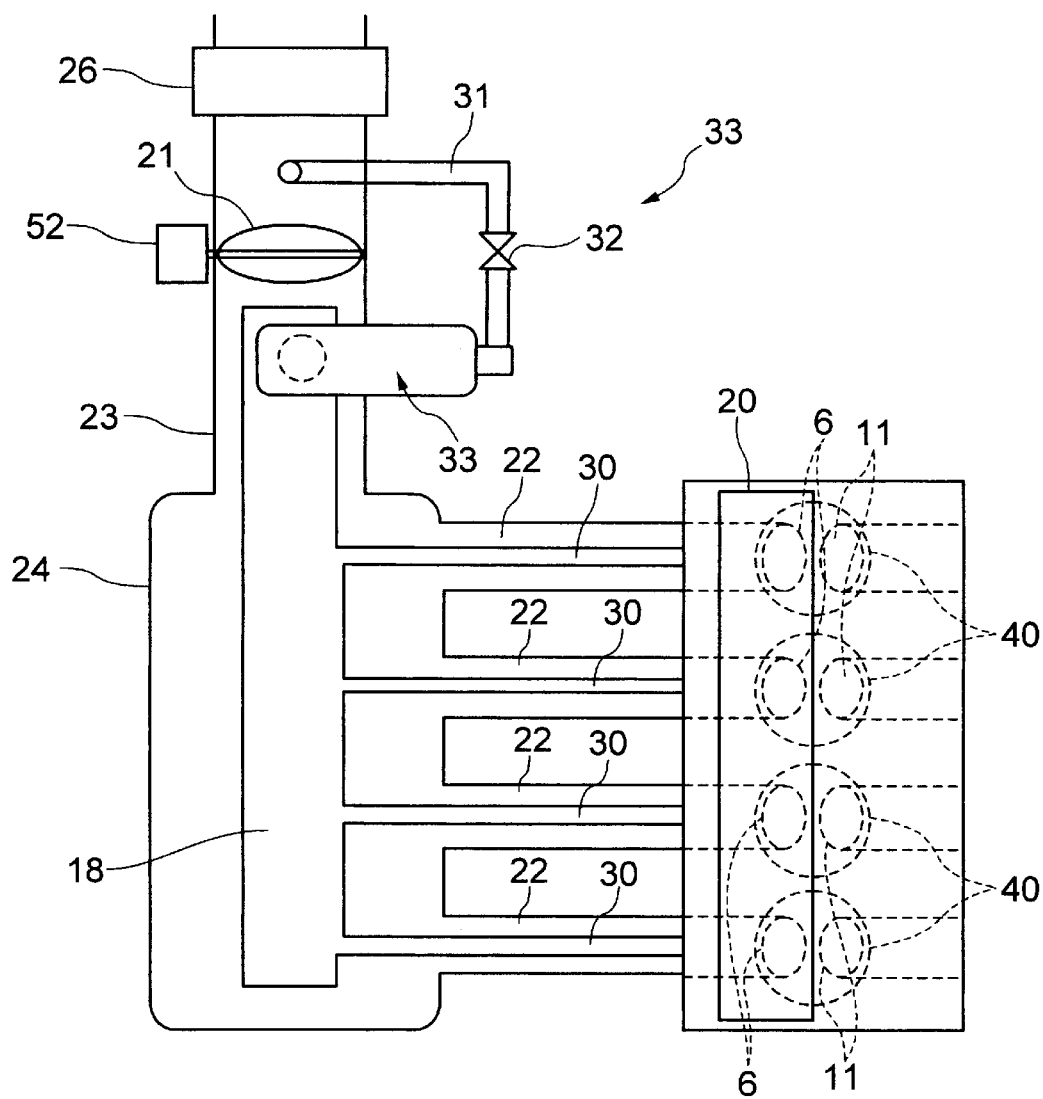
FIG. 3 is a schematic partially cross-sectional view showing an internal combustion engine into which the fuel supply apparatus of the invention is incorporated.

An arrangement of a first embodiment of the present invention is shown in FIGS. 1–3. An internal combustion engine has four combustion cylinders 40 (each of which corresponds to the claimed combustion chamber), and an induction system including an air cleaner 26, a main air intake passage 23 with a throttle valve 21, a surge tank 24 and a main diverging pipe 22 whose upstream end is fluidly connected to the main air intake passage 23 and whose downstream diverging ends are fluidly connected to the combustion cylinders 40 respectively. An air is supplied to the combustion cylinders 40 through the air cleaner 26, the main air intake passage 23, the surge tank 24 and the main diverging pipe 22. An air intake valve 6 and an exhaust valve 11 are attached to each of the combustion cylinders 40, and the air intake valve 6 is driven by a variable valve lifter (VVL) 20.

The variable valve lifter 20 can adjust a maximum lifted distance of the air intake valve 6 at each combustion cycle, so that the maximum lifted distance of the air intake valve 6 when an engine load is relatively small is smaller than the maximum lifted distance of the air intake valve 6 when the engine load is relatively great. The variable valve lifter 20 may adjust, together with the adjustment of the maximum lifted distance of the air intake valve 6 at each combustion cycle, a valve opening time period during which the air intake valve 6 is opened to allow the air to flow into the combustion cylinder 40 at each combustion cycle. The valve opening time period when the engine load is relatively small is smaller than the valve opening time period when the engine load is relatively great.

A fuel injection valve 12 as a first fuel supplier for each of the combustion cylinder 40 is attached to the main diverging pipe 22 to inject a fuel toward the air intake valve 6 at a predetermined timing. A supplemental air passage 31 with a bypass air flow regulator 32 bypasses the throttle valve 21 and is fluidly connected to each of the combustion cylinders 40 through a sub-air intake passage 18 and a sub-diverging pipe 30 whose upstream end is fluidly connected to the supplemental air passage 31 and whose downstream diverging ends are fluidly connected to the combustion cylinders 40 respectively. The sub-air intake passage 18 is fluidly separated from the main air intake passage 23 by a partition wall 37.

The sub-air intake passage 18 contains a vaporized fuel supplier 33 as a second fuel supplier including a supplemental fuel injection valve 13 and an electric heater 35 so that a vaporization of the fuel injected by the supplemental fuel injection valve 13 is accelerated by the electric heater 35.

A mixture of the air taken from an upstream side of the throttle valve 21 into the supplemental air passage 31 and the fuel supplied by the vaporized fuel supplier 33 is divided by the sub-diverging pipe 30 to be supplied to the combustion cylinders 40 respectively through respective sub-air intake passage outlets 36. The sub-air intake passage outlets 36 are arranged at a downstream side of the surge tank 24 and an upstream side of the intake valves 6 at the vicinity of the fuel injection valves 12 so that the mixture is smoothly guided to each of the combustion cylinders 40.

An engine controller unit (ECU) 50 with a microcomputer and so forth receives signals from various sensors for detecting operating conditions of the internal combustion engine, treats the signals with calculation, and outputs driving signals to the fuel injection valve 12, the supplemental fuel injection valve 13, the electric heater 35, the air flow regulator 32, a throttle valve actuator 52 and the variable valve lifter 20. The electric heater 35 is energized by the driving signal through an electric relay 51. By cooperation of an opening degree control of the throttle valve 21 by the throttle valve actuator 52, a lifted distance and/or opened time period control of the variable valve lifter 20 in accordance with the engine load, and a fuel injection rate and/or injection timing control of the fuel injection valve 12 under instructions from the engine controller unit 50, the mixture of fuel and air whose flow rate is determined in accordance with the engine load is supplied to each of the combustion cylinders 40.

A flow rate of the air taken from the upstream side of the throttle valve 21 through the supplemental air passage 31 into the sub-air intake passage 18 is adjusted by the bypass air flow regulator 32 while the mixture of the air and the fuel vaporized by the vaporized fuel supplier 33 is supplied to each of the combustion cylinders 40 through the respective sub-air intake passage outlets 36. The mixture supply from the sub-air intake passage 18 is brought about when the engine load is relatively low so that the (maximum) lifted distance of the air intake valves 6 is made less than a predetermined degree by the variable valve lifter 20.

Figure 4:
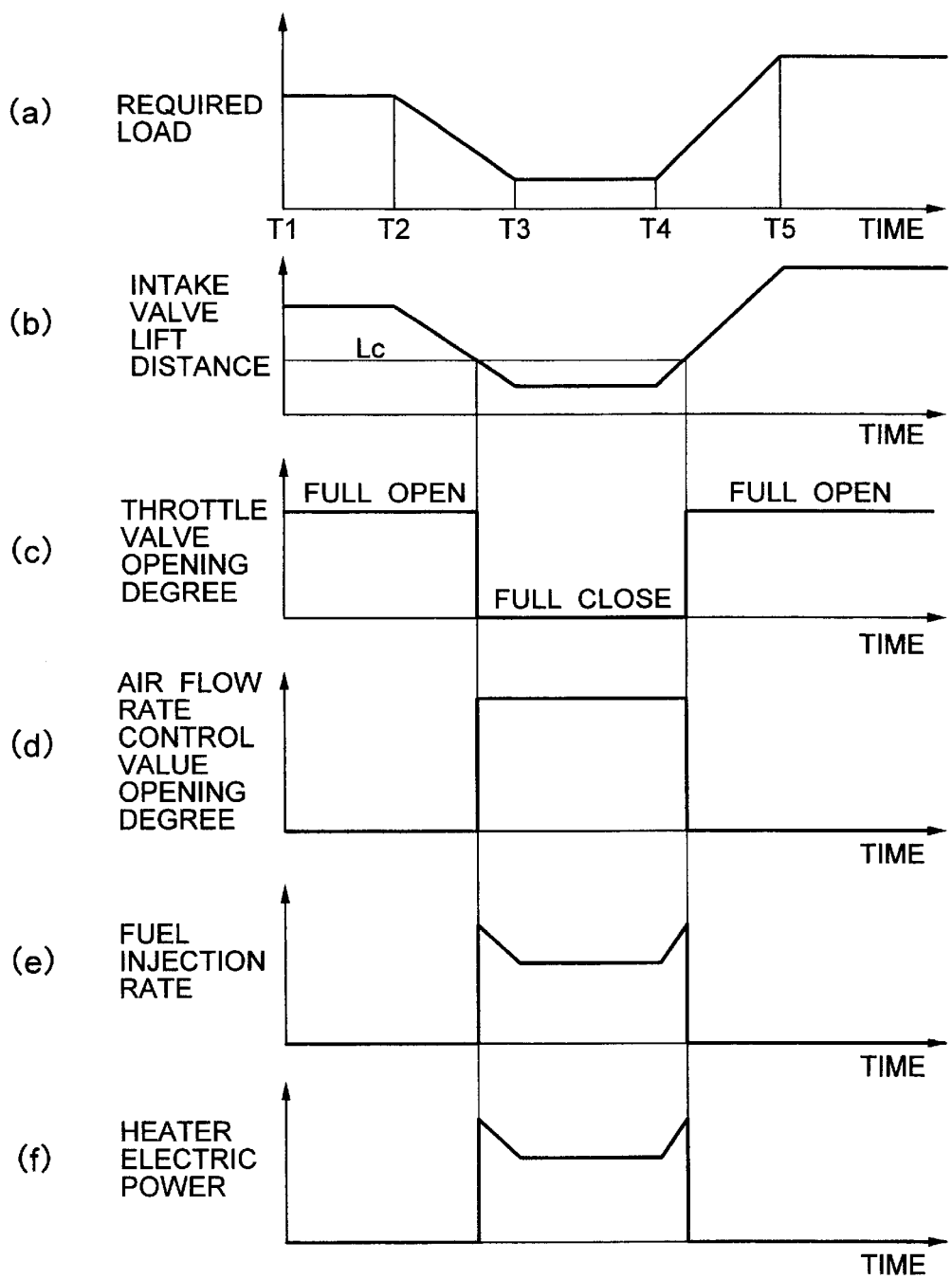
FIG. 4 includes a diagram part (a) showing a relationship between a time proceeding and a change of required load, a diagram part (b) showing a relationship between the time proceeding and a change of a maximum lifted distance of an intake valve at each combustion cycle, a diagram part (c) showing a relationship between the time proceeding and a change of an opening degree of a throttle valve, a diagram part (d) showing a relationship between the time proceeding and a change of an opening degree of an air flow rate control valve, a diagram part (e) showing a relationship between the time proceeding and a change of a fuel injection amount at each combustion cycle, and a diagram part (f) showing a relationship between the time proceeding and a change of an electric power supplied to a heater at each combustion cycle.

The control manner by the engine controller unit 50 is shown in FIG. 4. As shown in a diagram (a), the maximum lifted distance of the air intake valves 6 at each combustion cycle decreases in accordance with a decrease of the engine load so that an amount of the air supplied into each of the combustion cylinders 40 at each combustion cycle is decreased in accordance with the decrease of the engine load, as shown in a diagram (b). When the maximum lifted distance of the air intake valves 6 at each combustion cycle is not less than a threshold value Lc, the throttle valve 21 is fully opened in accordance with a control signal input to the throttle valve actuator 52 from the ECU 50 and when the maximum lifted distance of the air intake valves 6 at each combustion cycle is less than the threshold value Lc, the throttle valve 21 is fully closed in accordance with the control signal input to the throttle valve actuator 52 from the ECU 50, as shown in a diagram (c). The threshold value Lc is set preferably at 10% of the maximum lifted distance of the air intake valves 6 obtainable when the throttle valve 21 is fully opened.

When the maximum lifted distance of the air intake valves 6 at each combustion cycle is not less than the threshold value Lc, the bypass air flow regulator 32 is fully closed in accordance with the control signal from the ECU 50 and when the maximum lifted distance of the air intake valves 6 at each combustion cycle is less than the threshold value Lc, the bypass air flow regulator 32 is opened in accordance with the control signal from the ECU 50, as shown in a diagram (d). In other words, open-close actions of the bypass air flow regulator 32 and the throttle valve 21 are inverse with respect to each other.

A fuel injection rate at each combustion cycle by the supplemental fuel injection valve 13 is determined in accordance with an air (mass) flow rate measured by an air (mass) flow meter (not shown) in the main air intake passage 23 so that a ratio of the fuel injection rate at each combustion cycle to the air-mass flow rate supplied from the supplemental air passage 31 through the vaporized fuel supplier 33 to the combustion cylinders 40 is kept at a suitable degree, as shown in a diagram (e). The fuel injection rate at each combustion cycle by the supplemental fuel injection valve 13 is adjusted by changing an opening time period of the supplemental fuel injection valve 13 at each combustion cycle calculated by the ECU 50 on the basis of a required fuel injection rate at each combustion cycle. Preferably, the ratio of the fuel injection rate in mass by the supplemental fuel injection valve 13 to the air-mass flow rate supplied from the supplemental air passage 31 through the vaporized fuel supplier 33 to the combustion cylinders 40 at each combustion cycle is 1:14.7, that is, the theoretical air fuel ratio.

A heater electric power, that is, a heat energy supplied to the fuel supplied by the electric heater 35 of the vaporized fuel supplier 33 at each combustion cycle is controlled by the ECU 50 to be in proportion to the fuel injection rate in mass at each combustion cycle so that a vaporizing (vaporization increasing) speed (vaporized fuel increasing speed) is kept constant irrespective of change of the fuel injection rate in mass at each combustion cycle, as shown in a diagram (f).

When the maximum lifted distance of the air intake valves 6 at each combustion cycle controlled by the variable valve lifter 20 on the basis of the engine load is not less than the threshold value Lc, the throttle valve is opened and the supplemental air passage 31 is closed to prevent the air from being supplied to the vaporized fuel supplier 33. The air is supplied to the combustion cylinders 40 through the main air intake passage 23 and the main diverging pipe 22 when the air intake valves 6 is opened by a value of the maximum lifted distance at each combustion cycle determined on the basis of the engine load. The fuel of the injection rate in mass at each combustion cycle having a constant ratio with respect to the mass flow rate of the air at each combustion cycle measured by the air mass flow meter (not shown) is injected by the fuel injection valve 12. In this case, the fuel is prevented from being injected by the supplemental fuel injection valve 13, and the heater 35 is prevented from electrically energized.

In this embodiment, the fuel-air mixture is supplied to the combustion cylinders 40 by the vaporized fuel supplier 33 when the engine load is relatively low and the maximum lifted distance of the air intake valves 6 at each combustion cycle is set less than the threshold value Lc by the variable valve lifter 20. On the other hand, the fuel is injected by the fuel injector 12 and the air is supplied to the combustion cylinders 40 from the main diverging pipe 22 so that the air and the fuel are mixed with each other when the engine load is relatively high and the maximum lifted distance of the air intake valves 6 at each combustion cycle is set not less than the threshold value Lc by the variable valve lifter 20.

Figure 5:
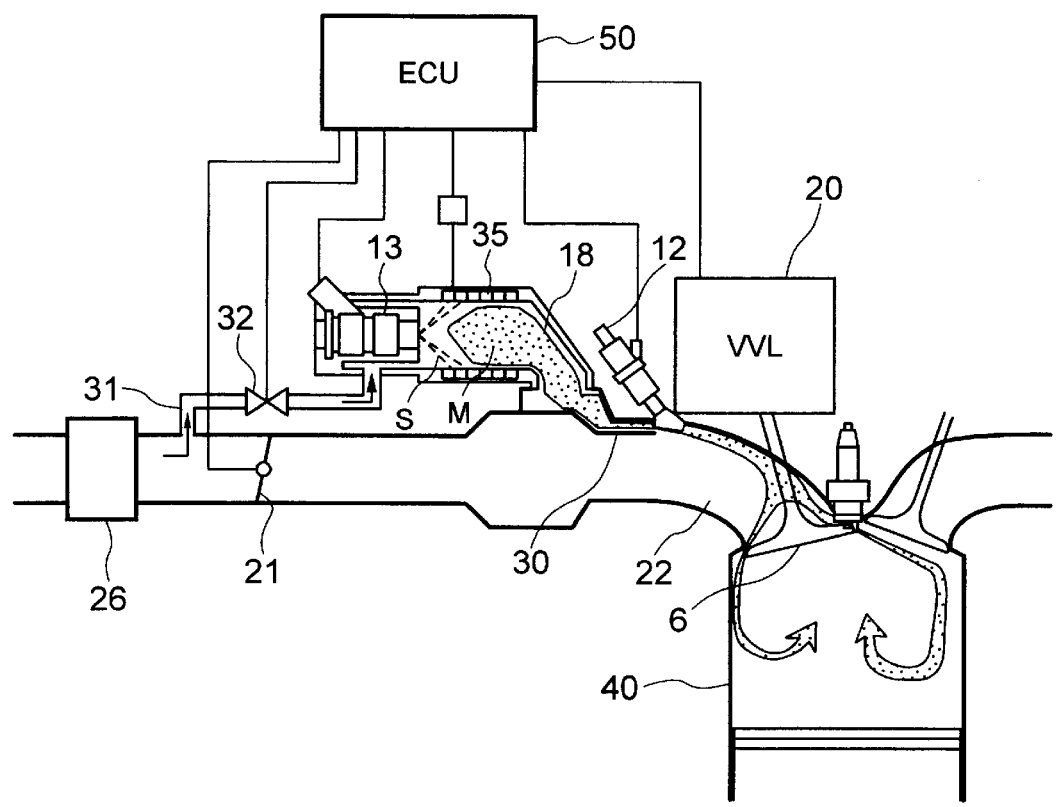
FIG. 5 is a schematic partially cross-sectional view showing a fuel-air mixture flow route of the invention formed when a maximum lifted distance of an air intake valve at each combustion cycle is less than a predetermined degree.

As shown in FIG. 5, when the engine load is relatively low and the maximum lifted distance of the air intake valves 6 at each combustion cycle is set less than the threshold value Lc through the variable valve lifter 20 by the ECU 50, the fuel mist S is injected by the supplemental fuel injection valve 13 in the vaporized fuel supplier 33, and the fuel mist S injected by the supplemental fuel injection valve 13 and the air supplied into the vaporized fuel supplier 33 from the supplemental air passage 31 are heated by the electric heater 35 to accelerate a vaporization of the fuel mist S. The vaporized fuel generated by the vaporization of the fuel mist S in the vaporized fuel supplier 33 and the air supplied into the vaporized fuel supplier 33 from the supplemental air passage 31 are mixed with each other to form a fuel-air mixture M, and subsequently the fuel-air mixture M is suplied to the combustion cylinders 40 through the sub-diverging pipe 30. Therefore, when the maximum lifted distance of the air intake valves 6 at each combustion cycle is set relatively small, the fuel is supplied in gaseous state by the vaporized fuel supplier 33 to prevent or restrain the fuel from existing on the air intake valve 6 and/or inner surfaces of the combustion cylinders 40 so that unburned hydro-carbon is restrained from being included by the exhaust gas.

Figure 6A:
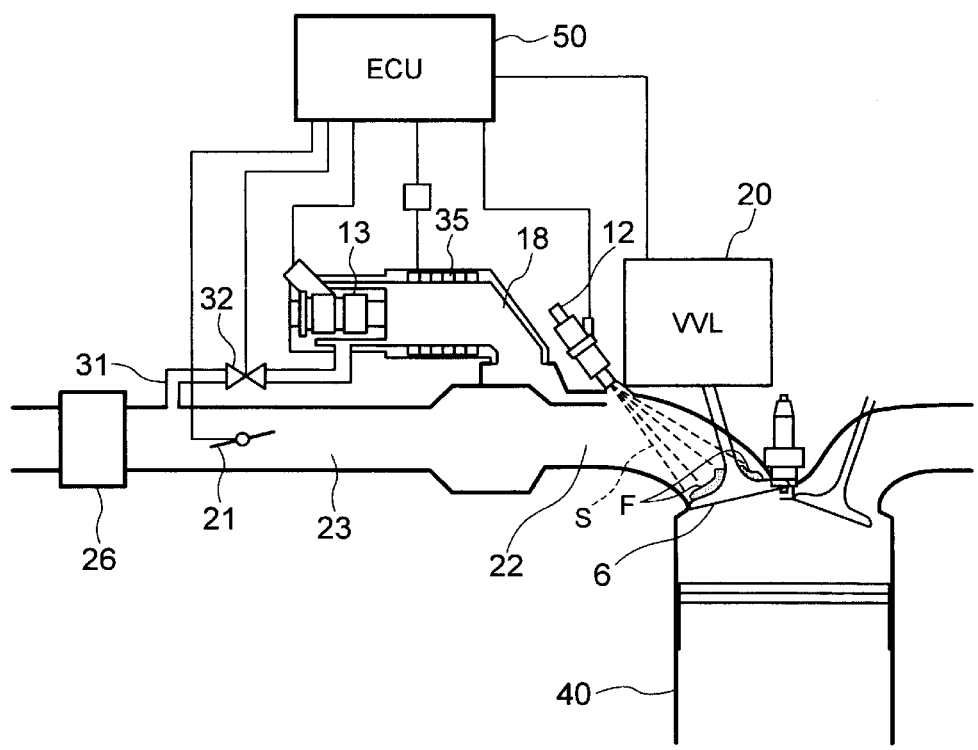
FIG. 6 includes a view part A showing a fuel injection during an exhaust piston stroke when the maximum lifted distance of the air intake valve at each combustion cycle is not less than the predetermined degree, and a view part B showing the fuel-air mixture flow during an air intake piston stroke when the maximum lifted distance of the air intake valve at each combustion cycle is not less than the predetermined degree.
Figure 6B:
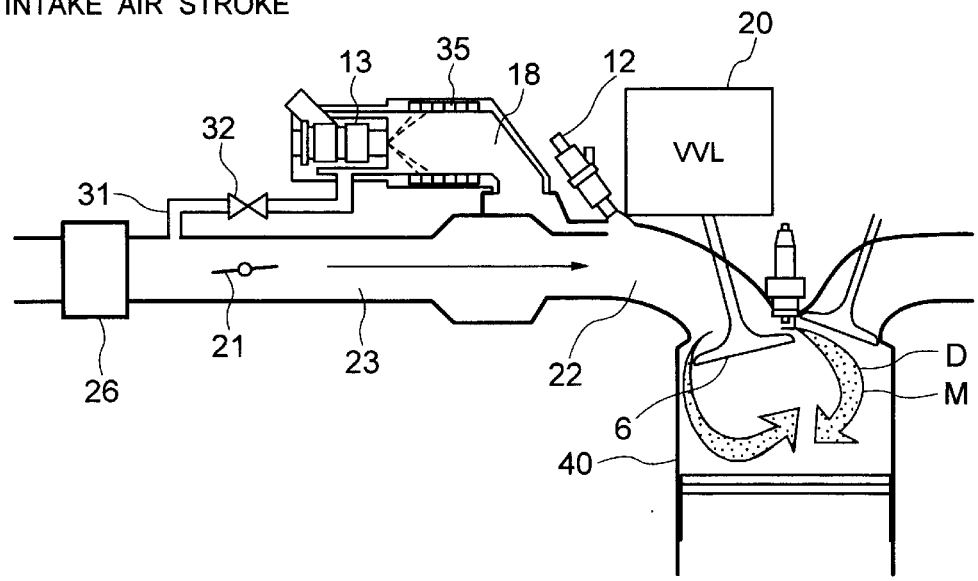

When the maximum lifted distance of the air intake valves 6 at each combustion cycle is relatively great as shown in FIG. 6, the fuel mist S injected into the main diverging pipe 22 by the fuel injector 12 during an exhaust piston stroke collides against the air intake valve 6 to form a fuel film F on a surface of the air intake valve 6. A part of the fuel film F is vaporized on the surface of the air intake valve 6 by heat energy supplied to the fuel film F from the air intake valve 6, and a remainder part thereof is taken into the combustion chamber 40 from the surface of the air intake valve 6 during an air intake piston stroke to form fuel droplets D in the combustion chamber 40. In this situation, since the maximum lifted distance of the air intake valves 6 at each combustion cycle is relatively great, a velocity of the air passing the surface of the air intake valve 6 into the combustion chamber 40 is relatively small to keep a kinetic energy of the fuel droplets D flowing into the combustion chamber 40 small, so that the fuel droplets D is restrained or prevented from colliding against the inner surface of the combustion chamber 40 and is vaporized in the combustion chamber 40 to form a fuel-air mixture gas M. Therefore, the unburned hydro-carbon is restrained from being included by the exhaust gas.

In the above embodiment, one of a main fuel root through the main diverging pipe 22 and the fuel injector 12 and a vaporized fuel root through the sub-diverging pipe 30 and the vaporized fuel supplier 33 is selected in accordance with a state of the maximum lifted distance of the air intake valves 6 at each combustion cycle. That is, when the maximum lifted distance of the air intake valves 6 at each combustion cycle is less than the threshold value Lc, the vaporized fuel root is selected to supply the fuel into the combustion chambers 40, and when the maximum lifted distance of the air intake valves 6 at each combustion cycle is not less than the threshold value Lc, the main fuel root is selected to supply the fuel into the combustion chambers 40.

Figure 7:
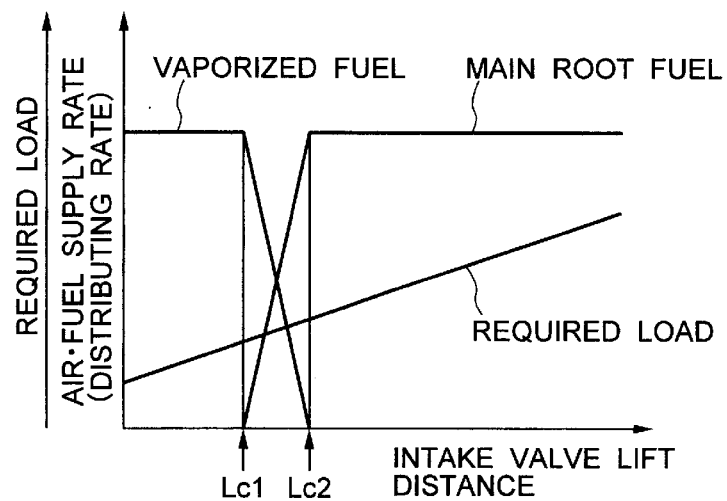
FIG. 7 is a diagram showing a relationship among the maximum lifted distance of the air intake valve at each combustion cycle, a load borne by engine, a percentage of a fuel flow rate through a vaporizing accelerating root with respect to a whole fuel flow rate supplied to a combustion chamber, and a percentage of a fuel flow rate through a normal root (not including particular vaporizing acceleration) with respect to the whole fuel flow rate supplied to a combustion chamber.

As shown in FIG. 7, both of the main fuel root and the vaporized fuel root may be used simultaneously or parallel to supply the fuel into the combustion chambers 40. When the engine load is relatively low and the maximum lifted distance of the air intake valves 6 at each combustion cycle is set less than a first threshold value Lc1 through the variable valve lifter 20 by the ECU 50, the throttle valve 21 is closed and the bypass air flow regulator 32 is opened to allow the fuel-air mixture to be supplied only through the vaporized fuel supplier 33 into the combustion chambers 40. When the engine load increases and the maximum lifted distance of the air intake valves 6 at each combustion cycle is set not less than the first threshold value Lc1 through the variable valve lifter 20 by the ECU 50, the throttle valve 21 is opened to supply the air from the main diverging pipe 22 and the fuel from the fuel injectors 12 while the bypass air flow regulator 32 is opened to allow the fuel-air mixture to be supplied through the vaporized fuel supplier 33 into the combustion chambers 40. A flow rate of the air through the main fuel root and the vaporized fuel root and a flow rate of the fuel through the main fuel root and the vaporized fuel root are adjusted to keep substantially the theoretical air fuel ratio of the fuel-air mixture supplied into the combustion chambers 40 by controlling the opening degrees of the throttle valve 21 and the bypass air flow regulator 32 and the fuel injection rates of the fuel injection valve 12 and the supplemental fuel injection valve 13 in accordance with the engine load.

When the maximum lifted distance of the air intake valves 6 at each combustion cycle is set not less than the first threshold value Lc1 and less than a second threshold value Lc2 through the variable valve lifter 20, the flow rates of the air and fuel through the main fuel root are increased and the flow rates of the air and fuel through the vaporized fuel supplier 33 are decreased in accordance with an increase of the maximum lifted distance of the air intake valves 6 at each combustion cycle, that is, an increase of the engine load.

When 2 (more than the first threshold value Lc1) through the variable valve lifter 20, the throttle valve 21 is opened to supply the air through the main fuel root from the main diverging pipe 22 and the fuel from the fuel injectors 12 while the bypass air flow regulator 32 is closed to prevent the fuel-air mixture from being supplied through the vaporized fuel supplier 33 into the combustion chambers 40.

In this embodiment, since a fuel-air mixture distribution rate or ratio between the main fuel root and the vaporized fuel root can be gradually changeable in accordance with the maximum lifted distance of the air intake valves 6 at each combustion cycle, the flow rates of the air and fuel supplied into the combustion chambers 40 can be smoothly changeable so that a contamination of the exhaust gas caused by switching between the main fuel root and the vaporized fuel root and a deterioration of derivability with abrupt output torque change caused by switching between the main fuel root and the vaporized fuel root are prevented.

Figure 8:
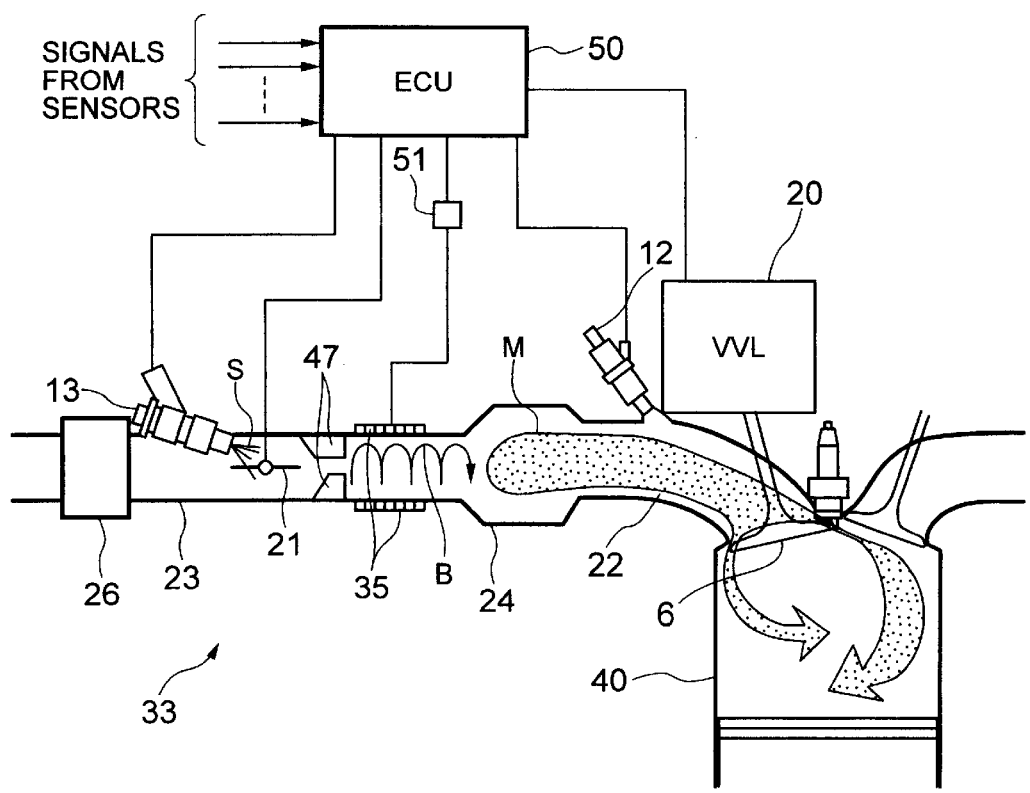
FIG. 8 is a schematic partially cross-sectional view showing a second embodiment fuel supply apparatus of the invention.

The vaporized fuel supplier 33 may be arranged in the main air intake passage 23 as shown in FIG. 8. The electric heater 35 is arranged on an inner cylindrical surface of the main air intake passage 23, and the supplemental fuel injection valve 13 is arranged at an upstream side of the throttle valve 21 in the air flow direction. A helical flow generator vane 47 is arranged between the throttle valve 21 and the electric heater 35 in the air flow direction to generate a helical air flow rotating along the inner cylindrical surface of the main air intake passage 23 so that the vaporized fuel supplier 33 is formed by the supplemental fuel injection valve 13, the helical flow generator vane 47, electric heater 35 and a part of the main air intake passage 23.

In this embodiment, when the engine load is relatively low and the maximum lifted distance of the air intake valves 6 at each combustion cycle is set less than the threshold value Lc through the variable valve lifter 20, the electric heater 35 is electrically energized at a predetermined electric power through the relay 51 by a instruction signal from the ECU 50, and the fuel is injected by the supplemental fuel injection valve 13 to be mixed with the air supplied from the main air intake passage 23 with a constant ratio between the mass flow rate of the fuel and the mass flow rate of the air.

During the air intake piston stroke, the air flowing from the air cleaner 26 into the main air intake passage 23 is urged by the helical flow generator vane 47 to rotate around a longitudinal axis of the main air intake passage 23 so that the helical air flow B is formed in the main air intake passage 23. The helical air flow B and the fuel mist S injected by the supplemental fuel injection valve 13 are heated by the electric heater 35 so that the fuel mist S is vaporized, and the vaporized fuel and the helical air flow B form a mixture gas M. Therefore, the mixture gas M in which the fuel is constantly distributed is supplied into the combustion chambers 40.

When the engine load is relatively high and the maximum lifted distance of the air intake valve 6 at each combustion cycle is set not less than the threshold value Lc through the variable valve lifter 20, the ECU 50 prevents the electric heater 35 from being energized electrically. The fuel is injected toward the air intake valve 6 by the fuel injection valve 12 during the air exhaust piston stroke or the air intake piston stroke. The air is taken into the combustion cylinders 40 through the air cleaner 26 and the main air intake passage 23 in the air intake piston stroke, and the fuel injected by the fuel injection valve 12 during the air exhaust piston stroke or the air intake piston stroke is vaporized in the combustion cylinders 40 to form the fuel-air mixture.

Figure 9:
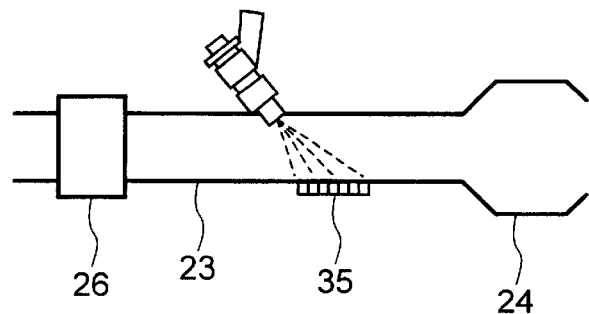
FIG. 9 is a schematic partially cross-sectional view showing a third embodiment fuel supply apparatus of the invention.

In this embodiment, the flow rate of the air supplied into the combustion cylinders 40 is adjusted by the lifted distance of the air intake valve 6 set by the variable valve lifter 20, so that the throttle valve 21 may be deleted. The helical flow generator vane 47 accelerates mixing between the fuel and air and vaporizing of the fuel. If a distance between the electric heater 35 and the combustion cylinders 40 along the air flow direction is sufficiently great for mixing between the fuel and air and vaporizing of the fuel or the electric heater generates the heat energy sufficient for securely vaporizing of the fuel, the helical flow generator vane 47 may be deleted, as shown in FIG. 9. It is preferable for vaporizing the fuel that the fuel is injected by the supplemental fuel injection valve 13 toward the electric heater 35 to collide against a heated surface of the electric heater 35.

Figure 10:
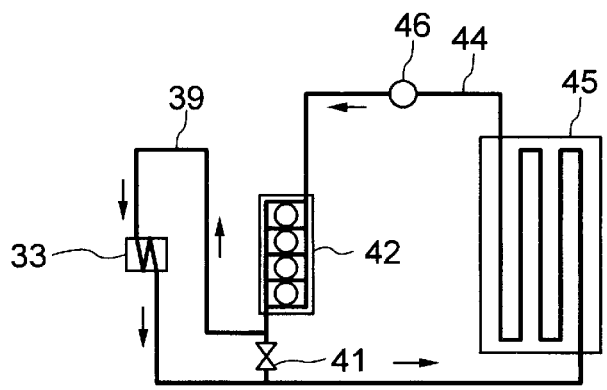
FIG. 10 is a schematic view showing an engine coolant flow arrangement usable for the fuel supply apparatus of the invention.

The fuel injected by the supplemental fuel injection valve 13 and the air supplied into the vaporized fuel supplier 33 through the supplemental air passage 31 may be heated by an engine coolant heated by the combustion engine as shown in FIG. 10. The engine coolant is fed by a coolant pump 46 through a radiator 45, a coolant passage 42 in a cylinder-block of the combustion engine and a main coolant passage 44 connecting fluidly them. A bypass coolant passage 39 connected fluidly to the main coolant passage 44 at a downstream side of the coolant passage 42 in the cylinder-block passes through the vaporized fuel supplier 33 so that the heated coolant flows from the coolant passage 42 through the vaporized fuel supplier 33 to the main coolant passage 44. A coolant control valve 41 controls a flow rate of the coolant supplied to the bypass coolant passage 39 under an opening degree instruction from the engine controller unit 50. The coolant control valve 41 may be a flow control valve for controlling gradually the opening degree thereof or a two-position valve to be set at selected one of full shut-off position and full open position.

Figure 11:
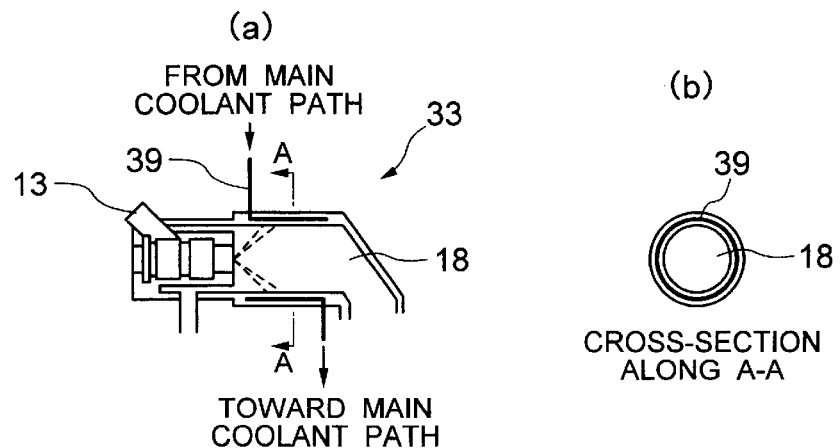
FIG. 11 includes a schematic partially cross-sectional view part (a) showing a fourth embodiment fuel supply apparatus of the invention, and a schematic partially cross-sectional view part (b) taken along A—A of the view part (a).

The vaporized fuel supplier 33 is heated by the engine coolant as shown in FIG. 11. The bypass coolant passage 39 surrounds a cylindrical inner surface of the vaporized fuel supplier 33 to heat the fuel and subsequently returns the engine coolant to the main coolant passage 44. The engine coolant of about 80° C. under normal engine condition heats the cylindrical inner surface of the vaporized fuel supplier 33 so that the fuel injected by the supplemental fuel injection valve 13 and the air supplied into the vaporized fuel supplier 33 is heated to accelerate the vaporization of the fuel for forming the fuel air mixture in the vaporized fuel supplier 33.

Figure 12:
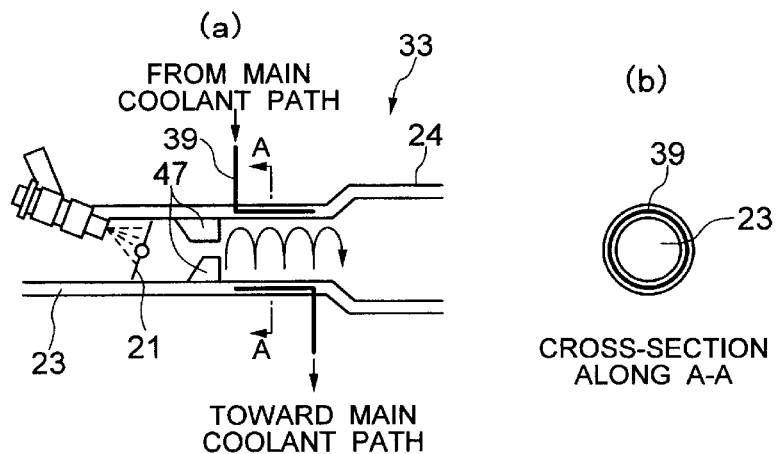
FIG. 12 includes a schematic partially cross-sectional view part (a) showing a fifth embodiment fuel supply apparatus of the invention, and a schematic partially cross-sectional view part (b) taken along A—A of the view part (a).

As shown in FIG. 12, the vaporized fuel supplier 33 heated by the engine coolant may be arranged in the main air intake passage 23. The bypass coolant passage 39 surrounds a cylindrical inner surface of the main air intake passage 23 to heat the fuel and air and subsequently returns the engine coolant to the main coolant passage 44. The engine coolant heats the cylindrical inner surface of the main air intake passage 23 so that the fuel injected by the supplemental fuel injection valve 13 and the air supplied into the vaporized fuel supplier 33 is heated to accelerate the vaporization of the fuel for forming the fuel air mixture in the main air intake passage 23.

In the embodiments as shown in FIGS. 10 and 11, when the engine load is relatively low and the maximum lifted distance of the air intake valves 6 at each combustion cycle is set less than the threshold value Lc, the coolant control valve 41 is closed by the instruction signal from the engine controller unit 50 to supply the engine coolant into the bypass coolant passage 39, while the bypass air flow regulator 32 is opened and the throttle valve 21 is closed by the instruction signal from the engine controller unit 50. The fuel is injected into the air supplied into the vaporized fuel supplier 33 from the supplemental air passage 31. The inner surface of the vaporized fuel supplier 33 is heated by the high temperature engine coolant to heat the air and fuel in the vaporized fuel supplier 33 so that the vaporization of the fuel is accelerated and the fuel air mixture is supplied from the vaporized fuel supplier 33 into the combustion cylinders 40.

When the engine load is relatively high and the maximum lifted distance of the air intake valves 6 at each combustion cycle is set not less than the threshold value Lc, the coolant control valve 41 is closed by the instruction signal from the engine controller unit 50 to prevent the engine coolant from being supplied into the bypass coolant passage 39, while the bypass air flow regulator 32 is closed and the throttle valve 21 is opened by the instruction signal from the engine controller unit 50. Therefore, the air is supplied into the combustion cylinders 40 through the main air intake passage 23 and the main diverging pipe 22, and the fuel is injected by the fuel injection valve 12 into the air in the main diverging pipe 22 to be supplied into the combustion cylinders 40. Subsequently, the fuel is vaporized in the combustion cylinders 40 and mixed with the air in the combustion cylinders 40.

When the maximum lifted distance of the air intake valves 6 at each combustion cycle is set not less than the threshold value Lc, the coolant control valve 41 may be closed to keep the temperature of the inner surface of the vaporized fuel supplier 33 high before the air fuel mixture is supplied from the vaporized fuel supplier 33 into the combustion cylinders 40, so that the fuel can be vaporized without a time delay just after the fuel is supplied in the vaporized fuel supplier 33 instead of the main fuel root.

An opening degree of the coolant control valve 41 may be changeable gradually in a variable range between the full open state and the full close state to control the temperature of the inner surface of the vaporized fuel supplier 33 minutely. The smaller the opening degree of the coolant control valve 41 is, the larger the flow rate of the engine coolant in the bypass coolant passage 39 is to keep the temperature of the inner surface of the vaporized fuel supplier 33 high. The larger the opening degree of the coolant control valve 41 is, the smaller the flow rate of the engine coolant in the bypass coolant passage 39 is to keep the temperature of the inner surface of the vaporized fuel supplier 33 low.

In the embodiment as shown in FIG. 12, when the engine load is relatively low and the maximum lifted distance of the air intake valves 6 at each combustion cycle is set less than the threshold value Lc, the vaporization of the fuel is accelerated by the high temperature engine coolant in the bypass coolant passage 39.

Figure 13:
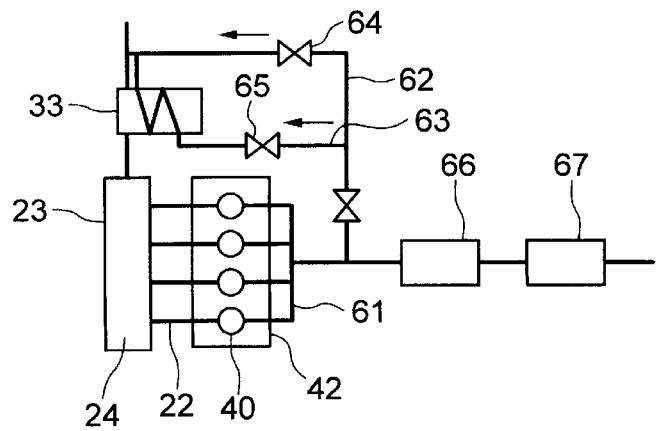
FIG. 13 is a schematic view showing an EGR arrangement usable for the fuel supply apparatus of the invention.

The fuel injected by the supplemental fuel injection valve 13 and the air supplied into the vaporized fuel supplier 33 through the supplemental air passage 31 may be heated by an engine exhaust gas heated by the combustion engine as shown in FIG. 13. An exhaust gas recirculation (EGR) main passage 62 is fluidly connected to an exhaust gas pipe 61 to recirculate the exhaust gas generated in the combustion chambers 40 into the main air intake passage 23 so that a burning speed in the combustion chambers 40 is decreased by the exhaust gas to decrease a maximum or peak temperature in the combustion chambers 40 for restraining Nitrogen-Oxide (NOx) from being generated in the combustion chambers 40. A bypass EGR passage 63 connected fluidly to the EGR main passage 62 passes through the vaporized fuel supplier 33 so that the exhaust gas flows through the vaporized fuel supplier 33 to the EGR main passage 62. EGR control valves 64 and 65 arranged in the EGR main passage 62 and bypass EGR passage 63 respectively controls a flow rate of the exhaust gas supplied to the vaporized fuel supplier 33 under an opening degree instruction from the engine controller unit 50. The combustion engine includes a Nitrogen-Oxide (NOx), unburned hydro carbon and carbon monoxide catalyst converter 66. The EGR control valves 64 and 65 may be a flow control valve for controlling gradually the opening degree thereof or a two-position valve to be set at selected one of full shut-off position and full open position.

Figure 14:
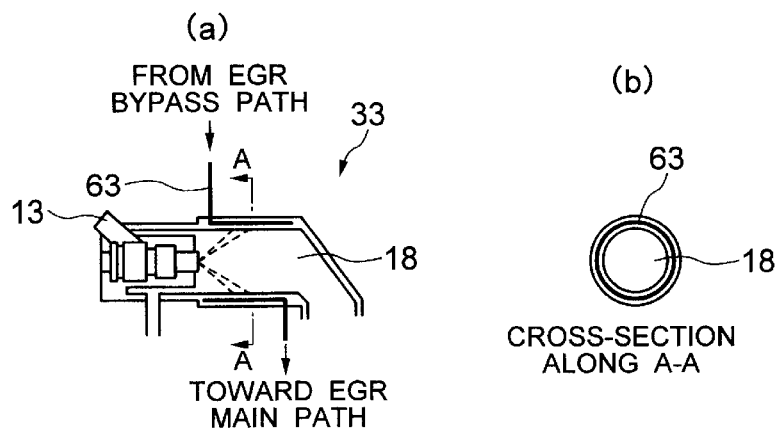
FIG. 14 includes a schematic partially cross-sectional view part (a) showing a sixth embodiment fuel supply apparatus of the invention, and a schematic partially cross-sectional view part (b) taken along A—A of the view part (a).

The vaporized fuel supplier 33 is heated by the exhaust gas as shown in FIG. 14. The bypass EGR passage 63 surrounds the cylindrical inner surface of the vaporized fuel supplier 33 to heat the fuel and subsequently returns the exhaust gas to the EGR main passage 62. When the EGR control valve 64 is closed and the EGR control valve 65 is opened, the high temperature exhaust gas generated in the combustion cylinders 40 is supplied into the bypass EGR passage 63 to heat the cylindrical inner surface of the vaporized fuel supplier 33 so that the fuel injected by the supplemental fuel injection valve 13 and the air supplied into the vaporized fuel supplier 33 is heated to accelerate the vaporization of the fuel for forming the fuel air mixture in the vaporized fuel supplier 33.

In the embodiments as shown in FIGS. 13 and 14, when the engine load is relatively low and the maximum lifted distance of the air intake valves 6 at each combustion cycle is set less than the threshold value Lc, the EGR control valve 64 is closed and the EGR control valve 65 is opened by the instruction signal from the engine controller unit 50 to supply the exhaust gas into the bypass EGR passage 63, while the bypass air flow regulator 32 is opened and the throttle valve 21 is closed by the instruction signal from the engine controller unit 50. The fuel is injected into the air supplied into the vaporized fuel supplier 33 from the supplemental air passage 31. The inner surface of the vaporized fuel supplier 33 is heated by the high temperature exhaust gas in the bypass EGR passage 63 to heat the air and fuel in the vaporized fuel supplier 33 so that the vaporization of the fuel is accelerated and the fuel air mixture is supplied from the vaporized fuel supplier 33 into the combustion cylinders 40.

When the engine load is relatively high and the maximum lifted distance of the air intake valves 6 at each combustion cycle is set not less than the threshold value Lc, the EGR control valve 64 is opened and the EGR control valve 65 is closed by the instruction signal from the engine controller unit 50 to prevent the exhaust gas from being supplied into the bypass EGR passage 63, while the bypass air flow regulator 32 is closed and the throttle valve 21 is opened by the instruction signal from the engine controller unit 50. Therefore, the air is supplied into the combustion cylinders 40 through the main air intake passage 23 and the main diverging pipe 22, and the fuel is injected by the fuel injection valve 12 into the air in the main diverging pipe 22 to be supplied into the combustion cylinders 40. Subsequently, the fuel is vaporized in the combustion cylinders 40 and mixed with the air in the combustion cylinders 40.

When the maximum lifted distance of the air intake valves 6 at each combustion cycle is set not less than the threshold value Lc, the EGR control valve 65 may be opened to keep the temperature of the inner surface of the vaporized fuel supplier 33 high before the air fuel mixture is supplied from the vaporized fuel supplier 33 into the combustion cylinders 40 or the fuel is supplied into the vaporized fuel supplier 33, so that the fuel can be vaporized without a time delay just after the fuel is supplied into the vaporized fuel supplier 33 instead of the main fuel root.

An opening degree of the EGR control valve 65 may be changeable gradually in a variable range between the full open state and the full close state to control the temperature of the inner surface of the vaporized fuel supplier 33 minutely. The larger the fuel injection rate supplied from the vaporized fuel supplier 33 is, the larger the flow rate of the exhaust gas by the EGR control valve 65 is to keep the temperature of the inner surface of the vaporized fuel supplier 33 high. The smaller the fuel injection rate supplied from the vaporized fuel supplier 33 is, the smaller the flow rate of the exhaust gas by the EGR control valve 65 is to keep the temperature of the inner surface of the vaporized fuel supplier 33 low.

Figure 15:
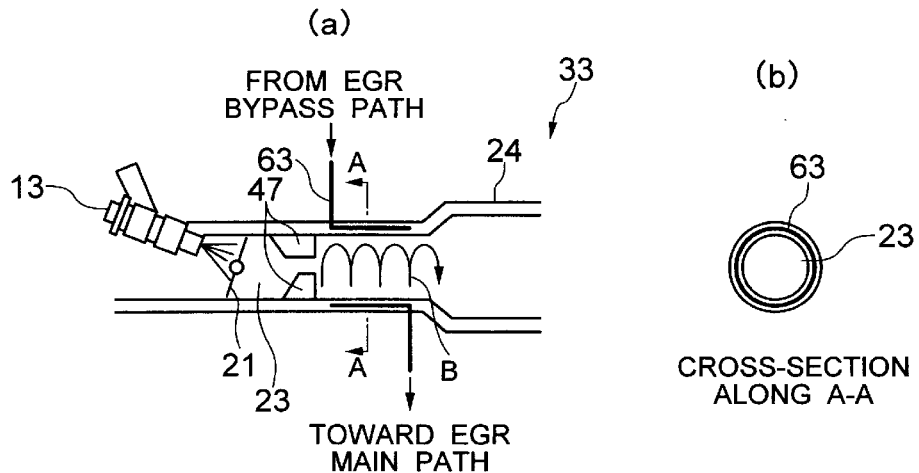
FIG. 15 includes a schematic partially cross-sectional view part (a) showing a seventh embodiment fuel supply apparatus of the invention, and a schematic partially cross-sectional view part (b) taken along A—A of the view part (a).

In the embodiment as shown in FIG. 15, when the engine load is relatively low and the maximum lifted distance of the air intake valves 6 at each combustion cycle is set less than the threshold value Lc, the vaporization of the fuel is accelerated by the high temperature exhaust gas in the bypass EGR passage 63.

Figure 16:
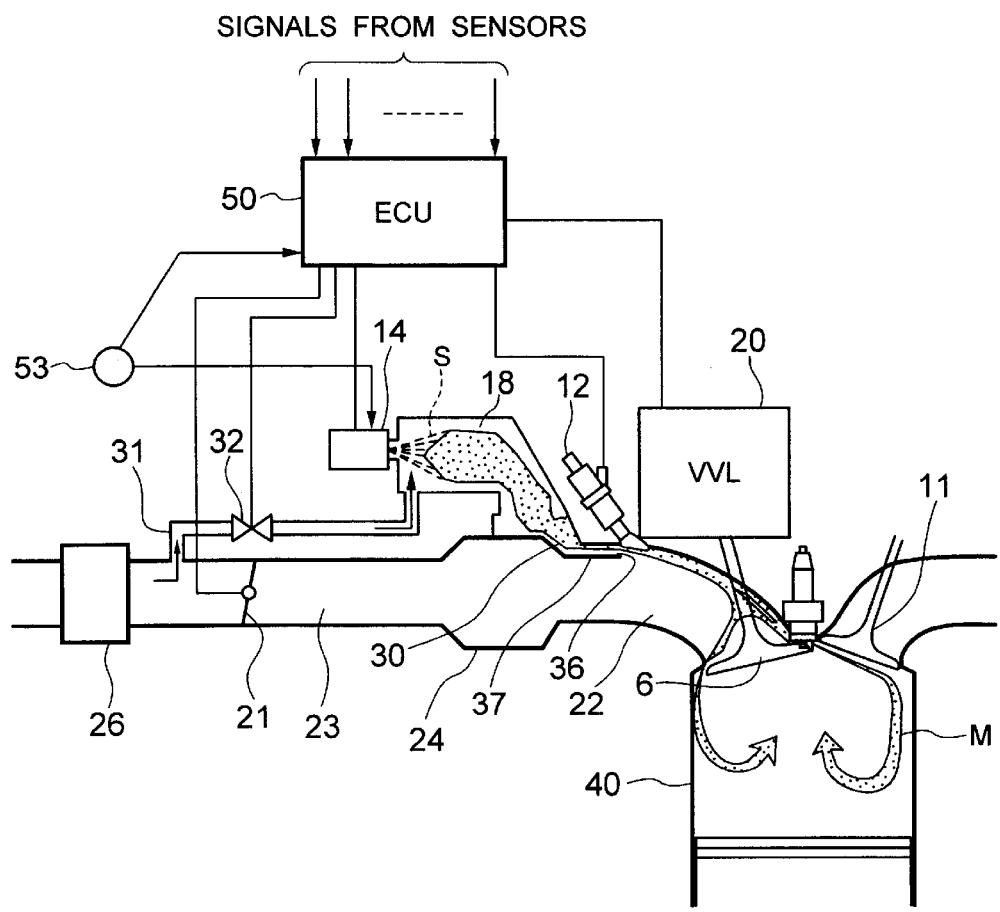
FIG. 16 a schematic partially cross-sectional view showing an eighth embodiment fuel supply apparatus of the invention.

The vaporized fuel supplier 33 may include a fuel injector 14 of air assist vaporizing type by which fine particles of the fuel mist is generated to accelerate the vaporization of the fuel as shown in FIG. 16. The fuel injector 14 of air assist vaporizing type as disclosed in JP-A-9-250422 is used with an air pump 53 for supplying an assist air to an outlet of the fuel injector 14 so that diameter of the particles of the fuel mist S injected by the fuel injector 14 to be supplied into the sub-air intake passage 18 is decreased to about 1–10 $\mu$m to accelerate the vaporization of the fuel mist S. When the bypass air flow regulator 32 is opened and the throttle valve 21 is closed, the air is supplied into the sub-air intake passage 18 from the supplemental air passage 31 fluidly connected to the main air intake passage 23 so that the air is mixed with the fuel mist S of fine particles to form the fuel air mixture M. Therefore, the vaporization of the fuel to be supplied into the combustion cylinders 40 is accelerated by kinetic energy of the air instead of the thermal energy.

Figure 17:
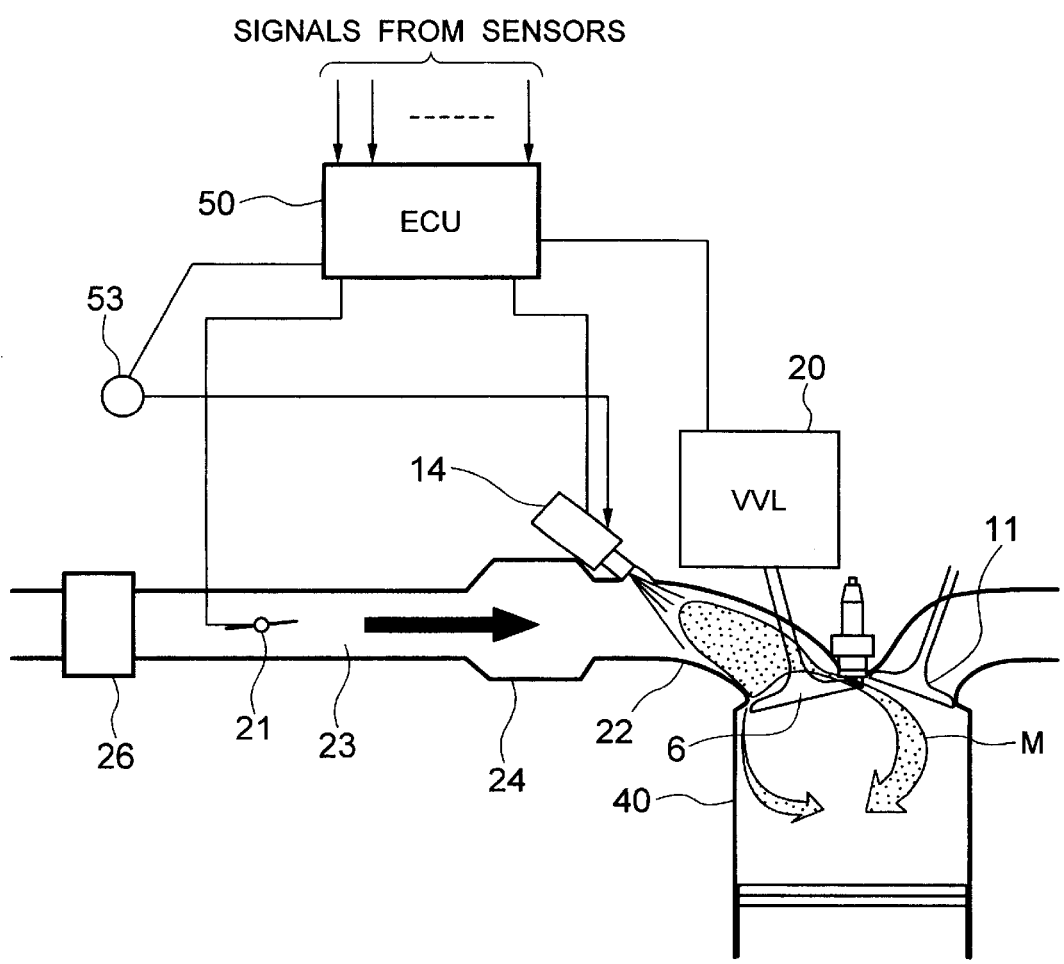
FIG. 17 a schematic partially cross-sectional view showing a ninth embodiment fuel supply apparatus of the invention.

As shown in FIG. 17, the fuel injector 14 of air assist vaporizing type may be mounted in the main diverging pipe 22 instead of the fuel injection valve 12. In this embodiment, when the engine load is relatively low and the maximum lifted distance of the air intake valves 6 at each combustion cycle is set less than the threshold value Lc, the assist air is supplied to the fuel injector 14 by the air pump 53 to supply the fuel mist S of fine particles of about 1–10 $\mu$m diameter into the main diverging pipe 22 from the fuel injector 14 during the air intake piston stroke. Since the fine particle diameter of the fuel mist S is sufficiently small for accelerating the vaporization of the fuel and keeping the kinetic energy of each fuel particle small, the fuel is vaporized before reaching the inner surfaces of the combustion cylinders 40 and it is difficult for the fuel particles to reach the inner surfaces of the combustion cylinders 40.

When the maximum lifted distance of the air intake valves 6 at each combustion cycle is set not less than the threshold value Lc, the fuel is injected into the main diverging pipe 22 by the fuel injector 14 without the air assist during the exhaust piston stroke. The vaporizing speed of the fuel is changeable by changing a ratio between the mass flow rate of the fuel and the mass flow rate of the assist air.

Figure 18:
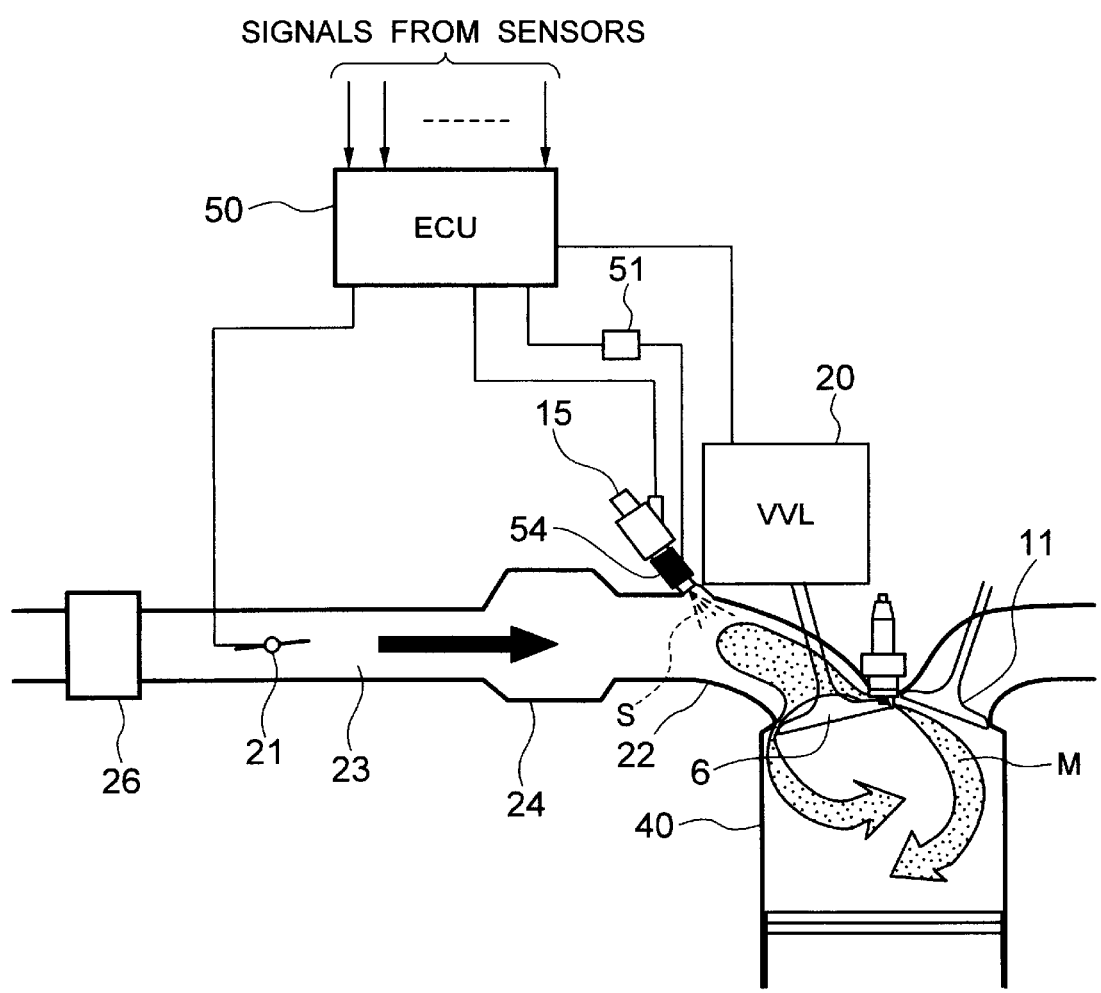
FIG. 18 a schematic partially cross-sectional view showing a tenth embodiment fuel supply apparatus of the invention.

As shown in FIG. 18, an fuel injection valve 15 as disclosed by JP-A-10-169526 may include a heater 54 for heating the fuel mist injected by the fuel injection valve 15 so that the vaporization of the fuel to be supplied into the main diverging pipe 22 is accelerated by the thermal energy applied to the fuel by the heater 54 under the instructions from the engine controller unit 50.

Figure 19:
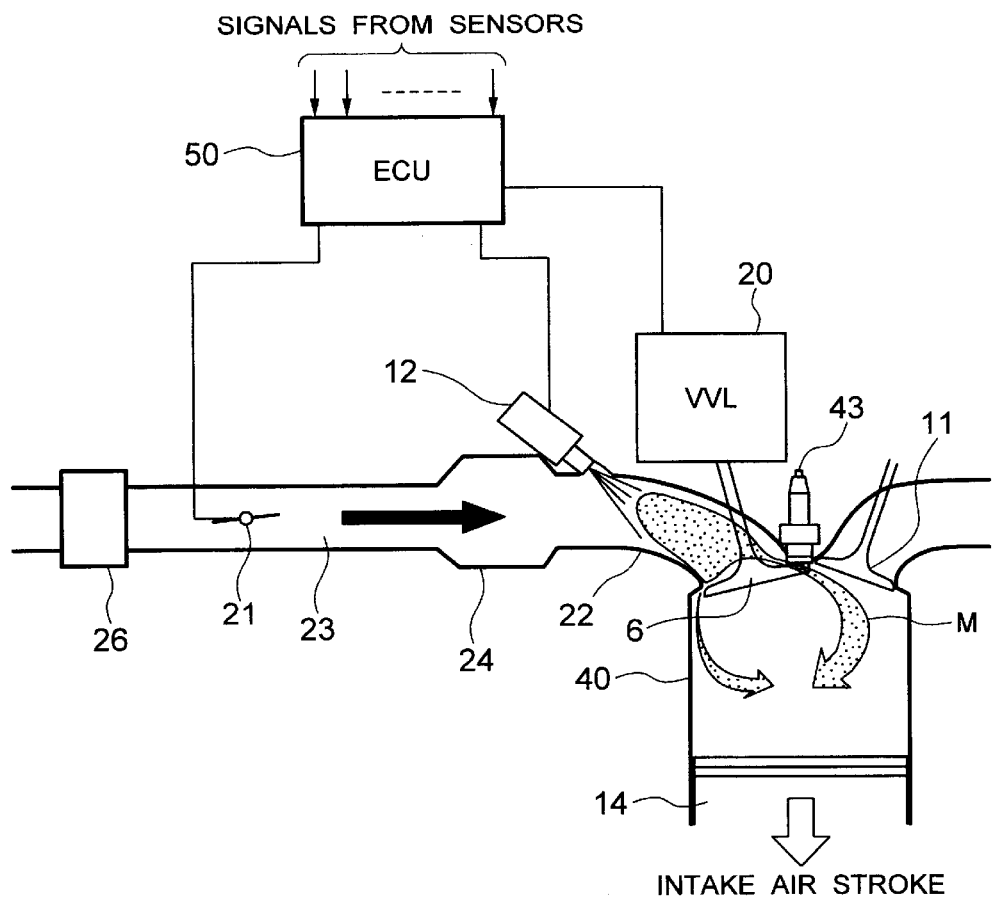
FIG. 19 a schematic partially cross-sectional view showing an eleventh embodiment fuel supply apparatus of the invention.
Figure 20:
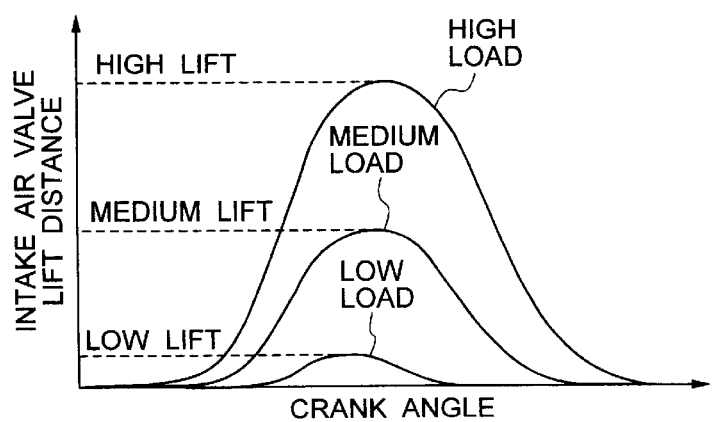
FIG. 20 is a diagram showing a relationship among a crank angular position, the maximum lifted distance of the air intake valve at each combustion cycle and a degree of the operation load borne by the engine.

As shown in FIG. 19, the vaporization of the fuel may be accelerated by collision between the fuel and the air passing the air intake valve 6 when the maximum lifted distance of the air intake valves 6 at each combustion cycle is set less than the threshold value Lc. The collision between the fuel and the air passing the air intake valve 6 can be strengthen by increasing a difference in pressure across the air intake valve 6 in the air flow direction. It is preferable that the smaller the maximum lifted distance of the air intake valves 6 at each combustion cycle is, the larger the difference in pressure across the air intake valve 6 is. For example, when the maximum lifted distance of the air intake valves 6 at each combustion cycle is set less than the threshold value Lc, the fuel is injected in the air intake piston stroke to increase the difference in pressure across the air intake valve 6 on which the fuel and the air are passing so that the vaporization of the fuel is accelerated by the high speed air flow on the air intake valve 6 to restrain the unburned hydro carbon remains in the combustion chambers 40. When the maximum lifted distance of the air intake valves 6 at each combustion cycle is set not less than the threshold value Lc, the fuel is injected by the fuel injection valve 12 during the exhaust piston stroke to prevent the injected fuel reaches the inner surfaces of the combustion cylinders 40 through the large lifted distance of the air intake valves 6 before being vaporized.

Figure 21:
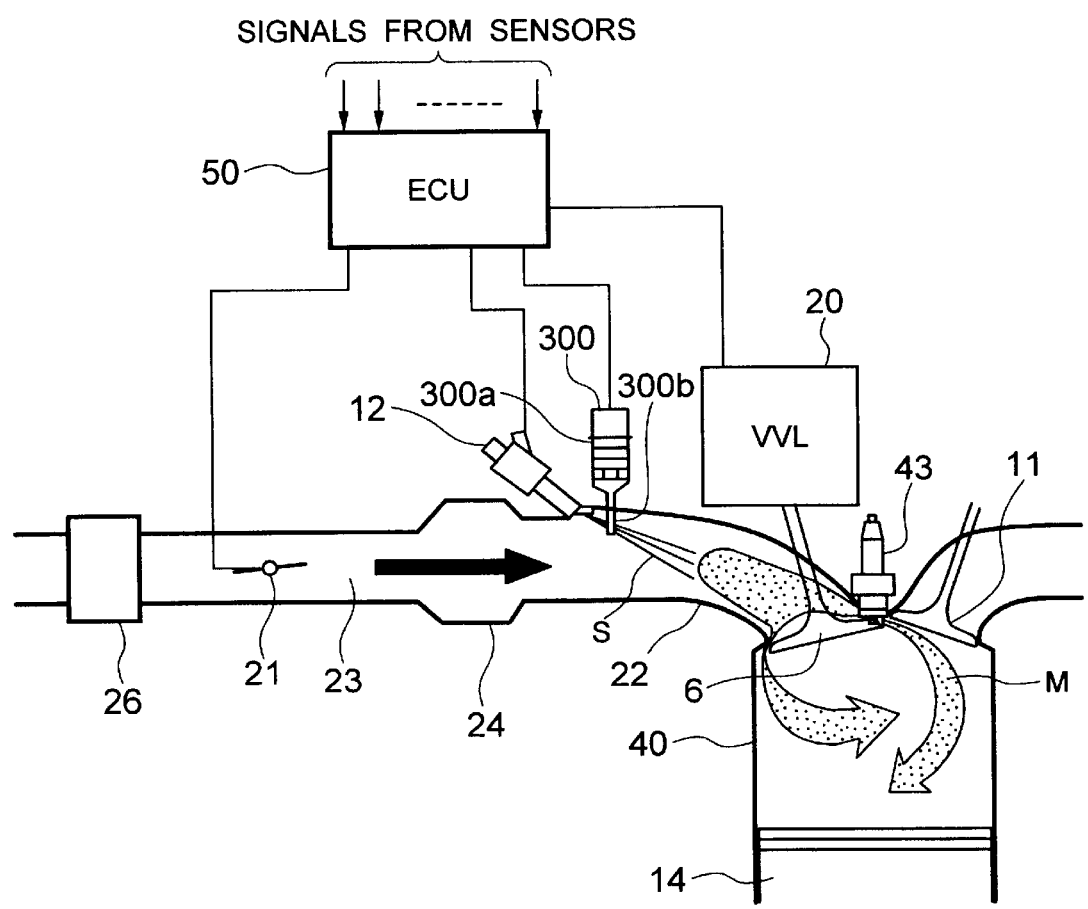
FIG. 21 a schematic partially cross-sectional view showing a twelfth embodiment fuel supply apparatus of the invention.

As shown in FIG. 21, the vaporization of the fuel in the main diverging pipe 22 and/or combustion cylinders 40 may be accelerated to completely vaporize the fuel in the main diverging pipe 22 and/or combustion cylinders 40 by a vibrator 300, preferably a ultrasonic transducer, arranged in the vicinity of a front end of the fuel injector 12 to vibrate the fuel so that a fuel mist S injected by the fuel injector 12 is further atomized to be changed to a fine fuel mist before reaching the air intake valves 6 so that a mixture M of the air and a significantly-highly vaporized fuel M is formed. The vibration of the vibrator 300 is controlled by the ECU 50. Relationships in attitude and position between the fuel injector 12 and the vibrator 300 are set in such a manner that the fuel mist S reaches a vibrating rod 300b of the vibrator 300 driven by a piezoelectric element 3a of the vibrator 300. When the engine load is relatively low, that is, the opening degree of the air intake valves 6 is less than a threshold value Lc, the ECU 50 energizes the vibrator 300 to vibrate so that the fine fuel mist formed by atomizing of the vibrator 300 is injected into the main diverging pipe 22 during the air-intake piston stroke with accelerating the vaporizing of the supplied fuel by atomizing the supplied fuel to restrain the fuel in liquid condition from existing in the combustion cylinders 40 or reaching the inner surfaces of the combustion cylinders 40. When the engine load is relatively high, that is, the opening degree of the air intake valves 6 is not less than the threshold value Lc, the ECU 50 does not energize the vibrator 300 so that the fuel mist formed by the fuel injector 12 is injected into the main diverging pipe 22 during the exhaust piston stroke.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for supplying fuel in an internal combustion engine including a combustion chamber, and an air intake valve for selectively allowing an air and the fuel to flow through the air intake valve into the combustion chamber, comprising the steps of:

generating a control signal in such a manner that at least one of vaporization and atomization of the fuel increases in accordance with a decrease in load of the internal combustion engine, and changing the at least one of vaporization and atomization of the fuel in accordance with the control signal.

2. A method according to claim 1, wherein a maximum distance of a movable valve body of the air intake valve at each of the combustion cycles from a shut-off position of the movable valve body thereof increases in accordance with an increase in load of the internal combustion engine.

3. A method for supplying fuel in an internal combustion engine including a combustion chamber, an air intake valve for selectively allowing an air and the fuel to flow through the air intake valve into the combustion chamber, and a variable valve lifter for adjusting an opening degree of the air intake valve with respect to the combustion chamber at each of combustion cycles, comprising the steps of:

generating a control signal for changing a degree of vaporization of the fuel passing the air intake valve in accordance with one of the opening degree of the air intake valve and a load of the combustion engine to restrain the fuel of liquid state from existing in the combustion chamber, and changing a vaporizing speed of the supplied fuel in accordance with the control signal to adjust the degree of vaporization of the fuel.

4. A method according to claim 3, wherein the control signal is generated in such a manner that the vaporizing speed of the fuel is increased in accordance with a decrease of the at least one of the opening degree of the air intake valve and the load.

5. A method according to claim 3, wherein the control signal is generated in such a manner that the vaporizing speed of the fuel when the at least one of the opening degree of the air intake valve and the load is not more than a predetermined value is higher than the vaporizing speed of the fuel when the at least one of the opening degree of the air intake valve and the load is more than the predetermined value.

6. A method according to claim 3, wherein a fuel injector is capable of changing a timing of fuel injection with respect to a pressure in the combustion chamber in accordance with the control signal, and the control signal is generated in such a manner that the pressure in the combustion chamber obtainable when the fuel is injected lowers in accordance with a decrease of the at least one of the opening degree of the air intake valve and the load so that the vaporization of the fuel is accelerated by a difference in pressure across the air intake valve to increase the degree of vaporization of the fuel.

7. A method according to claim 3, wherein a fuel injector is capable of changing a timing of fuel injection in accordance with the control signal, and the control signal is generated in such a manner that, when the at least one of the opening degree of the air intake valve and the load is not more than a predetermined value, the fuel is injected during a flow of the air into the combustion chamber through the air intake valve and is prevented from being injected during a flow of an exhaust gas out of the combustion chamber.

8. An apparatus for supplying fuel in an internal combustion engine including a combustion chamber, and an air intake valve for selectively allowing an air and the fuel through the air intake valve to flow into the combustion chamber, comprising:

a fuel supplier for supplying the fuel to an upstream side of the air intake valve, a vaporizing accelerator for at least one of vaporizing and atomizing in accordance with a control signal the fuel supplied by the fuel supplier, and a controller for generating the control signal for adjusting the at least one of vaporization and atomization of the fuel in accordance with a condition of the internal combustion engine.

9. An apparatus according to claim 8, wherein the condition of the internal combustion engine is a load of the internal combustion engine.

10. An apparatus according to claim 8, wherein the condition of the internal combustion engine is a maximum distance of a movable valve body of the air intake valve at each of the combustion cycles from a shut-off position of the movable valve body thereof, and the maximum distance of the movable valve body is changeable in accordance with a load of the internal combustion engine.

11. An apparatus according to claim 8, wherein the fuel supplier is a fuel injector.

12. An apparatus according to claim 8, wherein the vaporizing accelerator includes a heater.

13. An apparatus according to claim 8, wherein the vaporizing accelerator includes an atomizer.

14. An apparatus according to claim 8, wherein the vaporizing accelerator includes an air flow supplier for atomizing the fuel.

15. An apparatus for supplying fuel in an internal combustion engine including a combustion chamber, an air intake valve for selectively allowing an air and the fuel through the air intake valve to flow into the combustion chamber, and a variable valve lifter for adjusting an opening degree of the air intake valve with respect to the combustion chamber at each of combustion cycles, comprising:

a vaporizing speed adjuster for changing a vaporizing speed of the supplied fuel in accordance with a control signal to adjust a degree of vaporization of the fuel passing the air intake valve, and a controller for generating the control signal for changing the degree of vaporization of the fuel in accordance with at least one of the opening degree of the air intake valve and a load of the internal combustion engine to restrain the fuel of liquid state from existing in the combustion chamber.

16. An apparatus according to claim 15, wherein the control signal is generated in such a manner that the vaporizing speed of the fuel is increased in accordance with a decrease of the at least one of the opening degree of the air intake valve and the load.

17. An apparatus according to claim 15, wherein the control signal is generated in such a manner that the vaporizing speed of the fuel when the at least one of the opening degree of the air intake valve and the load is not more than a predetermined value is higher than the vaporizing speed of the fuel when the at least one of the opening degree of the air intake valve and the load is more than the predetermined value.

18. An apparatus according to claim 15, wherein the vaporizing speed adjuster includes a fuel injector to change a timing of fuel injection in accordance with the control signal, and when the at least one the opening degree of the air intake valve and the load is not more than a predetermined value, the fuel is injected during a flow of the air into the combustion chamber through the air intake valve and is prevented from being injected during a flow of an exhaust gas out of the combustion chamber.

19. An apparatus according to claim 15, wherein the vaporizing speed adjuster includes a first fuel supply path capable of supplying a fuel of relatively high vaporization degree and a second fuel supply path capable of supplying a fuel of relatively low vaporization degree, and the control signal is generated to change a ratio between a fuel flow rate through the first fuel supply path and a fuel flow rate through the second fuel supply path so that the vaporizing speed of the fuel is changed in accordance with the ratio.

20. An apparatus according to claim 15, wherein the opening degree of the air intake valve is a maximum opening degree of the air intake valve at each of the combustion cycles.

21. An apparatus according to claim 15, wherein the opening degree of the air intake valve is a maximum distance of a movable valve body of the air intake valve at each of the combustion cycles from a shut-off position of the movable valve body thereof.

22. An apparatus according to claim 15, wherein the vaporizing speed adjuster is arranged at an upstream side of the air intake valve in a fuel flow direction.

23. An apparatus according to claim 15, wherein the opening degree of the air intake valve is changeable in accordance with a change of at least one of an output power and an output torque of the internal combustion engine.

24. An apparatus according to claim 15, wherein the vaporizing speed adjuster includes a vibrator to vibrate the fuel so that the vaporization of the fuel is accelerated by atomizing the fuel with vibrating the fuel to increase the degree of vaporization of the fuel.

25. An apparatus according to claim 15, wherein the vaporizing speed adjuster includes a heater to heat the supplied fuel so that the vaporization of the fuel is accelerated by thermal energy to increase the degree of vaporization of the fuel.

26. An apparatus according to claim 25, wherein the vaporizing speed of the supplied fuel is changeable in accordance with a variation of the heating thermal energy quantity.

27. An apparatus according to claim 25, wherein the thermal energy of the heater is obtainable from at least one of electric power, a coolant of the combustion engine and an exhaust gas flowing out of the combustion chamber.

28. An apparatus according to claim 15, wherein the vaporizing speed adjuster includes an air injector to inject an air into the fuel so that the vaporization of the fuel is accelerated by collision between the fuel and the injected air to increase the degree of vaporization of the fuel.

29. An apparatus according to claim 28, wherein the vaporizing speed of the supplied fuel is changeable in accordance with a mass flow rate of the injected air.

30. An apparatus according to claim 15, wherein the vaporizing speed adjuster includes a fuel injector to change a timing of fuel injection with respect to a pressure in the combustion chamber in accordance with the control signal, and the control signal is generated in such a manner that the pressure in the combustion chamber obtainable when the fuel is injected by the fuel injector lowers in accordance with a decrease of the at least one of the opening degree of the air intake valve and the load so that the vaporization of the fuel is accelerated by a difference in pressure across the air intake valve to increase the degree of vaporization of the fuel.

31. An apparatus according to claim 30, wherein the fuel is injected with the pressure in the combustion chamber less than a predetermined degree and is prevented from being injected with the pressure in the combustion chamber not less than the predetermined degree, when the at least one of the opening degree of the air intake valve and the load is not more than a predetermined value.

32. An apparatus according to claim 30, wherein the fuel is injected with the pressure in the combustion chamber less than a predetermined degree and is prevented from being injected with the pressure in the combustion chamber not less than the predetermined degree.

33. An apparatus according to claim 32, wherein a pressure at an upstream side of the air intake valve in a fuel flow direction is higher than the pressure in the combustion chamber when the pressure in the combustion chamber is less than the predetermined degree.

* * * * *